US011261280B2

(12) United States Patent
Mitchell et al.

(10) Patent No.: US 11,261,280 B2
(45) Date of Patent: *Mar. 1, 2022

(54) FLUORINATED BLOCK COPOLYMERS

(71) Applicant: 3M INNOVATIVE PROPERTIES COMPANY, St. Paul, MN (US)

(72) Inventors: Michael H. Mitchell, Woodbury, MN (US); Denis Duchesne, Woodbury, MN (US); Tatsuo Fukushi, Woodbury, MN (US); Larry A. Last, Moulton, AL (US); Peter J. Scott, Woodbury, MN (US); Karl D. Weilandt, Meerbusch (DE)

(73) Assignee: 3M Innovative Properties Company, St. Paul, MN (US)

( * ) Notice: Subject to any disclaimer, the term of this patent is extended or adjusted under 35 U.S.C. 154(b) by 319 days.

This patent is subject to a terminal disclaimer.

(21) Appl. No.: 16/477,019

(22) PCT Filed: Jan. 12, 2018

(86) PCT No.: PCT/US2018/013547
§ 371 (c)(1),
(2) Date: Jul. 10, 2019

(87) PCT Pub. No.: WO2018/136331
PCT Pub. Date: Jul. 26, 2018

(65) Prior Publication Data
US 2021/0284780 A1 Sep. 16, 2021

Related U.S. Application Data

(60) Provisional application No. 62/447,636, filed on Jan. 18, 2017.

(51) Int. Cl.
C08F 293/00 (2006.01)
C08F 2/22 (2006.01)
C08F 214/16 (2006.01)
C08F 214/22 (2006.01)
C08F 214/26 (2006.01)
C08F 214/28 (2006.01)
C08K 5/14 (2006.01)

(52) U.S. Cl.
CPC ............ C08F 293/005 (2013.01); C08F 2/22 (2013.01); C08F 214/16 (2013.01); C08F 214/22 (2013.01); C08F 214/26 (2013.01); C08F 214/28 (2013.01); C08K 5/14 (2013.01); C08F 2438/01 (2013.01)

(58) Field of Classification Search
CPC .. C08F 293/005; C08F 214/22; C08F 214/26; C08F 214/28; C08F 293/00
See application file for complete search history.

(56) References Cited

U.S. PATENT DOCUMENTS

| 3,929,934 | A | * | 12/1975 | Moore | ................. C08F 259/08 524/520 |
| 4,158,678 | A | | 6/1979 | Tatemoto | |
| 4,603,175 | A | | 7/1986 | Kawachi | |
| 4,780,939 | A | | 11/1988 | Belter | |
| 5,225,504 | A | | 7/1993 | Tatsu | |
| 5,585,449 | A | | 12/1996 | Arcella | |
| 5,605,971 | A | | 2/1997 | Arcella | |
| 5,612,419 | A | | 3/1997 | Arcella | |
| 5,717,036 | A | | 2/1998 | Saito | |
| 5,741,855 | A | * | 4/1998 | Kaduk | .................... C08L 23/08 522/109 |
| 6,107,363 | A | | 8/2000 | Gayer | |
| 6,207,758 | B1 | * | 3/2001 | Brinati | ................ C08F 293/005 264/473 |
| 6,310,141 | B1 | | 10/2001 | Chen | |
| 6,323,283 | B1 | | 11/2001 | Apostolo | |
| 6,503,986 | B1 | | 1/2003 | Tanaka | |
| 6,512,063 | B2 | | 1/2003 | Tang | |
| 6,635,717 | B1 | * | 10/2003 | Kishine | ................. C08F 293/00 525/276 |

(Continued)

FOREIGN PATENT DOCUMENTS

| CA | 2037234 | 9/1991 |
| CN | 103038266 | 4/2013 |

(Continued)

OTHER PUBLICATIONS

Peyser, "Polymer Handbook", 209-258 (1989).

(Continued)

*Primary Examiner* — Robert C Boyle
(74) *Attorney, Agent, or Firm* — Julie Lapos-Kuchar

(57) ABSTRACT

Described herein is a millable fluorinated block copolymer having (a) at least one A block, wherein the A block is a semi-crystalline segment comprising repeating divalent monomeric units derived from at least TFE, HFP and VDF; (b) at least one B block, wherein the B block is a segment comprising repeating divalent monomeric units derived from at least HFP and VDF; and (c) a bisolefin monomer, wherein at least (i) the semi-crystalline segment of the A block comprises repeating divalent monomeric units derived from TFE, HFP, VDF, and the bisolefin monomer, (ii) the segment of the B block comprises repeating divalent monomeric units derived from HFP, VDF, and the bisolefin monomer, or (iii) a combination thereof; and wherein the millable fluorinated block copolymer has a modulus of 0.1 to 2.5 MPa at 100° C.

19 Claims, No Drawings

(56) References Cited

U.S. PATENT DOCUMENTS

| | | |
|---|---|---|
| 6,646,077 B1 | 11/2003 | Lyons |
| 6,710,132 B2 | 3/2004 | Apostolo |
| 6,822,050 B2 | 11/2004 | Albano |
| 6,844,036 B2 | 1/2005 | Apostolo |
| 7,348,366 B2 | 3/2008 | Walker |
| 7,521,513 B2 | 4/2009 | Tang |
| 7,671,112 B2 | 3/2010 | Hintzer |
| 9,156,926 B2 | 10/2015 | Lochhaas |
| 2004/0254268 A1 | 12/2004 | Cernohous |
| 2008/0021148 A1 | 1/2008 | Adair |
| 2008/0116603 A1 | 5/2008 | Grootaert |
| 2011/0112265 A1 | 5/2011 | Washino |
| 2012/0108756 A1 | 5/2012 | Komatsu |
| 2013/0109797 A1 | 5/2013 | Fantoni |
| 2015/0073111 A1 | 3/2015 | Hung |
| 2015/0094428 A1 | 4/2015 | Thenappan |
| 2016/0369021 A1 | 12/2016 | Manzoni |

FOREIGN PATENT DOCUMENTS

| | | |
|---|---|---|
| EP | 0661312 | 7/1995 |
| EP | 10130341 | 5/1998 |
| EP | 0924257 | 6/1999 |
| EP | 0967248 | 12/1999 |
| EP | 1029875 | 8/2000 |
| EP | 1262517 | 12/2002 |
| EP | 1262518 | 12/2002 |
| EP | 1304341 | 4/2003 |
| JP | 2009227780 | 10/2009 |
| JP | 2009256658 | 11/2009 |
| JP | 2011241299 | 12/2011 |
| JP | 2014070206 | 4/2014 |
| WO | WO 1996-17877 | 6/1996 |
| WO | WO 1997-047683 | 12/1997 |
| WO | WO 2000-004091 | 1/2000 |
| WO | WO 2009-119723 | 10/2009 |
| WO | WO 2011-007862 | 1/2011 |
| WO | WO 2012-007374 | 1/2012 |
| WO | WO 2014-030586 | 2/2014 |
| WO | WO 2014-062469 | 4/2014 |
| WO | WO 2015-047749 | 4/2015 |
| WO | WO 2015-134435 | 9/2015 |
| WO | WO 2016-109339 | 7/2016 |
| WO | WO 2016-137851 | 9/2016 |
| WO | WO 2017-011379 | 1/2017 |
| WO | WO 2018-136324 | 7/2018 |
| WO | WO 2018-136332 | 7/2018 |

OTHER PUBLICATIONS

Salamone, "Polymeric Materials Encyclopedia", 432-440 (1996).
Sorenson, "Preperative Methods of Polymer Chemistry", 209-215 (1968).
International Search Report for PCT International Application No. PCT/US2018/013547, dated May 21, 2018, 4 pages.

* cited by examiner

FLUORINATED BLOCK COPOLYMERS

CROSS REFERENCE TO RELATED APPLICATIONS

This application is a national stage filing under 35 U.S.C. 371 of PCT/US2018/013547, filed Jan. 12, 2018, which claims the benefit of U.S. Application No. 62/447,636, filed Jan. 18, 2017, the disclosure of which is incorporated by reference in its/their entirety herein.

TECHNICAL FIELD

Fluorinated block copolymers that can be processed as an elastomer are described.

SUMMARY

There has been an increasing need for higher temperature elastomers that perform adequately at for example, temperatures of 200° C. to 330° C. Because of the higher bond energy of the C—F bond, perfluoroelastomers (fully fluorinated molecules) traditionally have been used at these extreme temperature conditions. However, the cost of perfluoroelastomers can make them undesirable or prohibitive for certain applications and markets.

Partially fluorinated elastomers are typically less expensive than perfluorinated elastomers and because they comprise some fluorine, they can perform adequately in some of the same extreme conditions as the perfluorinated elastomers, e.g., chemical resistance, etc. However, partially fluorinated elastomers traditionally have poor tensile properties at elevated temperatures, as a result a partially fluorinated elastomer that have high tensile strength at elevated temperatures is desired.

Thus, there is a desire to identify a fluoropolymer material, which has improved properties such as a high modulus. In some embodiments, there is also a desire for the material to be processed as an elastomer, for example, by a two-roll mill or an internal mixer.

In one aspect, a curable composition is provided comprising a millable fluorinated block copolymer having (a) at least one A block, wherein the A block is a semi-crystalline segment comprising repeating divalent monomeric units derived from at least TFE, HFP and VDF;

(b) at least one B block, wherein the B block is a segment comprising repeating dilvalent monomeric units derived from at least HFP and VDF; and (c) a bisolefin monomer, wherein at least (i) the semi-crystalline segment of the A block comprises repeating divalent monomeric units derived from TFE, HFP, VDF, and the bisolefin monomer, (ii) the segment of the B block comprises repeating divalent monomeric units derived from HFP, VDF, and the bisolefin monomer, or (iii) a combination thereof; and wherein the millable fluorinated block copolymer has a modulus of 0.1 to 2.5 MPa at 100° C.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"backbone" refers to the main continuous chain of the polymer;

"copolymer" refers to a polymeric material comprising at least two different interpolymerized monomers (i.e., the monomers do not have the same chemical structure) and include terpolymers (three different monomers), tetrapolymers (four different monomers), etc.;

"crosslinking" refers to connecting two pre-formed polymer chains using chemical bonds or chemical groups;

"cure site" refers to functional groups, which may participate in crosslinking;

"glass transition temperature" or "$T_g$" refers to the temperature at which a polymeric material transitions from a glassy state to a rubbery state. The glassy state is typically associated with a material that is, for example, brittle, stiff, rigid, or combinations thereof. In contrast, the rubbery state is typically associated with a material that is, for example, flexible and elastomeric.

"interpolymerized" refers to monomers that are polymerized together to form a polymer backbone;

"millable" is the ability of a material to be processed on rubber mills and internal mixers;

"monomer" is a molecule which can undergo polymerization which then form part of the essential structure of a polymer;

"perfluorinated" means a group or a compound derived from a hydrocarbon wherein all hydrogen atoms have been replaced by fluorine atoms. A perfluorinated compound may however still contain other atoms than fluorine and carbon atoms, like chlorine atoms, bromine atoms and iodine atoms; and "polymer" refers to a macrostructure comprising interpolymerized units of monomers.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Thermoplastic elastomers are a class of materials, either being copolymers or a blend of polymers that have both thermoplastic and elastomeric properties. Typically, the plastic component give additional tensile strength, while the elastomeric component provides elasticity and compression set resistance to the material. Thermoplastic elastomers having a high plastic component are traditionally processed similar to plastics using for example extruders, injection molding equipment, etc. Elastomeric materials on the other hand are typically processed with a two-roll mill or an internal mixer. Mill blending is a process that rubber manufacturers use to combine the polymer gum with the requisite curing agents and/or additives. In order to be mill blended, the curable composition must have a sufficient modulus. In other words, not too soft that it sticks to the mill, and not too stiff that it cannot be banded onto mill.

The present disclosure relates to a crystalline-containing polymer that has sufficient elastomeric properties and can be processed similarly to an elastomer. Additionally, the polymer has good tensile strength and compression set, in particular at elevated temperatures.

The present disclosure is directed toward a fluorinated block copolymer. "Block copolymers" are polymers in which chemically different blocks or sequences are covalently bonded to each other. The fluorinated block copolymers of the present disclosure include at least two different polymeric blocks; referred to as the A block and the B block. The A block and the B block have different chemical compositions and/or different glass transition temperatures.

In the present disclosure, at least one of the A block, B block, or both the A and B block is derived from at least one bisolefin monomer. In one embodiment, the bisolefin monomer is of the formula

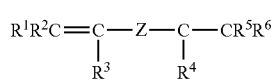

(I)

wherein $R^1$, $R^2$, $R^3$, $R^4$, $R^5$, and $R^6$ are independently H, a C1-C5 alkyl group, or a C1-C5 fluorinated alkyl group; and Z is an alkylene or cycloalkylene radical, which is linear or branched, optionally containing oxygen atoms and optionally fluorinated. In one embodiment, $R_1$, $R_2$, $R_3$, and $R_4$ are, independently from each other, F, $CF_3$, $C_2F_5$, $C_3F_7$, $C_4F_9$, H, $CH_3$, $C_2H_5$, $C_3H_7$, or $C_4H_9$. In one embodiment, Z comprises at least 1, 2, 3, 4, or even 5 carbon atoms and at most 8, 10, 12, 16, or even 18 carbon atoms. In one embodiment, Z is $-O-Rf_1-O-$; $-CF_2-O-Rf_1-O-CF_2-$; or $CF_2-O-Rf_1-O-$, wherein $Rf_1$ represents a residue selected from linear or branched perfluoroalkanediyl, perfluorooxaalkanediyl or perfluoropolyoxaalkanediyl residues or a residue according to $Rf_2$. In one embodiment, $Rf_1$ contains at least 1, 2, 3, 4, or even 5 carbon atoms; and at most 8, 10, 12, or even 14 carbon atoms. $Rf_2$ is a non-fluorinated, a fluorinated or a perfluorinated arylene. The arylene may be non-substituted or substituted with one or more halogen atoms other than F, perfluorinated alkyl residues, perfluorinated alkoxy residues, perfluorinated oxaalkyl residues, perfluorinated polyoxaalkyl residues, fluorinated, perfluorinated or non-fluorinated phenyl or phenoxy moieties or combinations thereof, wherein the phenyl or phenoxy residues may be non-substituted or substituted with one or more perfluorinated alkyl, alkoxy, oxaalkyl or polyoxaalkyl residue or one or more halogen atoms other than F or combinations thereof. In one embodiment, $Rf_2$ contains at least 1, 2, 3, 4, or even 5 carbon atoms; and at most 10, 12, or even 14 carbon atoms.

Exemplary bisolefin monomers include: $CH_2=CH(CF_2)_4CH=CH_2$, $CH2=CH(CF_2)_6CH=CH_2$, $CH_2=CH(CF_2)_8CH=CH_2$, $CF_2=CF-O-(CF_2)_2-O-CF=CF_2$, $CF_2=CF-O-(CF_2)_3-O-CF=CF_2$, $CF_2=CF-O-(CF_2)_4-O-CF=CF_2$, $CF_2=CF-O-(CF_2)_5-O-CF=CF_2$, $CF_2=CF-O-(CF_2)_6-O-CF=CF_2$, $CF_2=CF-CF_2-O-(CF_2)_2-O-CF=CF_2$, $CF_2=CF-CF_2-O-(CF_2)_3-O-CF=CF_2$, $CF_2=CF-CF_2-O-(CF_2)_4-O-CF=CF_2$, $CF_2=CF-CF_2-O-(CF_2)_4-O-CF=CF_2$, $CF_2=CF-CF_2-O-(CF_2)_5-O-CF=CF_2$, $CF_2=CF-CF_2-O-(CF_2)_6-O-CF=CF_2$, $CF_2=CF-CF_2-O-(CF_2)_2-O-CF_2-CF=CF_2$, $CF_2=CF-CF_2-O-(CF_2)_3-O-CF_2-CF=CF_2$, $CF_2=CF-CF_2-O-(CF_2)_4-O-CF_2-CF=CF_2$, $CF_2=CF-CF_2-O-(CF_2)_5-O-CF_2-CF=CF_2$, $CF_2=CF-CF_2-O-(CF_2)_6-O-CF_2-CF=CF_2$, $CF_2=CF-O-CF_2CF_2-CH=CH_2$, $CF_2=CF-(OCF(CF_3)CF_2)-O-CF_2CF_2-CH=CH_2$, $CF_2=CF-(OCF(CF_3)CF_2)_2-O-CF_2CF_2-CH=CH_2$, $CF_2=CF-CF_2-O-CF_2CF_2-CH=CH_2$, $CF_2=CFCF_2-(OCF(CF_3)CF_2)-O-CF_2CF_2-CH=CH_2$, $CF_2=CFCF_2-(OCF(CF_3)CF_2)_2-O-CF_2CF_2-CH=CH_2$, $CF_2=CF-CF_2-O-(CF_2)_c-O-CF_2-CF_2-CH=CH_2$ wherein c is an integer selected from 2 to 6, $CF_2=CFCF_2-O-(CF_2)_c-O-CF_2-CF_2-CH=CH_2$ wherein c is an integer selected from 2 to 6, $CF_2=CF-(OCF(CF_3)CF_2)_b-O-CF(CF_3)-CH=CH_2$ wherein b is 0, 1, or 2, $CF_2=CF-CF_2-(OCF(CF_3)CF_2)_b-O-CF(CF_3)-CH=CH_2$ wherein b is 0, 1, or 2, $CH_2=CH-(CF_2)_n-O-CH=CH_2$ wherein n is an integer from 1-10, and $CF_2=CF-(CF_2)_a-(O-CF(CF_3)CF_2)_b-O-(CF_2)_c-(OCF(CF_3)CF_2)_f-O-CF=CF_2$ wherein a is 0 or 1, b is 0, 1, or 2, c is 1, 2, 3, 4, 5, or 6, and f is 0, 1, or 2.

The A block of the present disclosure is a semi-crystalline segment. If studied under a differential scanning calorimetry (DSC), the block would have at least one melting point temperature ($T_m$) of greater than 70, 80, 90, 100, 120, or even 150° C.; and at most 200, 250, 275, 300, or even 325° C. and a measurable enthalpy, for example, greater than 0 J/g (Joules/gram), or even greater than 0.01 J/g. The enthalpy is determined by the area under the curve of the melt transition as measured by DSC using the test disclosed herein and expressed as Joules/gram (J/g).

In one embodiment, the A block is a copolymer derived from at least the following monomers: tetrafluoroethylene (TFE), hexafluoropropylene (HFP), and vinylidene fluoride (VDF). In one embodiment, the A block comprises 30-85 wt % TFE, 5-40 wt % HFP, and 5-55 wt % VDF; 30-75 wt % TFE, 5-35 wt % HFP, and 5-50 wt % VDF; 40-70 wt % TFE, 10-30 wt % HFP, and 10-45 wt % VDF; or even 45-70 wt % TFE, 10-30 wt % HFP, and 10-45 wt % VDF. In one embodiment, the A block comprises 30-85 wt % TFE, 5-40 wt % HFP, 5-55 wt % VDF, and 0.01-1 wt % of a bisolefin monomer; 30-75 wt % TFE, 5-35 wt % HFP, 5-50 wt % VDF, and 0.01-1 wt % of a bisolefin monomer; or even 40-70 wt % TFE, 10-30 wt % HFP, 10-45 wt % VDF, and 0.01-1 wt % of a bisolefin monomer.

Additional monomers may also be incorporated into the A block, such as perfluorovinyl ether and perfluoroallyl ether monomers. Typically, these additional monomers are used at percentages of less than 10, 5, 3, or even 1% by weight relative to the other monomers used.

Examples of perfluorovinyl ethers that can be used in the present disclosure include those that correspond to the formula: $CF_2=CF-O-R_f$ wherein $R_f$ represents a perfluorinated aliphatic group that may contain no, one or more oxygen atoms and up to 12, 10, 8, 6 or even 4 carbon atoms. Exemplary perfluorinated vinyl ethers correspond to the formula: $CF_2=CFO(R^a{}_fO)_n(R^b{}_fO)_mR^c{}_f$ wherein $R^a{}_f$ and $R^b{}_f$ are different linear or branched perfluoroalkylene groups of 1-6 carbon atoms, in particular 2-6 carbon atoms, m and n are independently 0-10 and $R^c{}_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2=CFOCF_2OCF_3$, $CF_2=CFOCF_2OCF_2CF_3$, and $CF_3-(CF_2)_2-O-CF(CF_3)-CF_2-O-CF(CF_3)-CF_2-O-CF=CF_2$.

Examples of perfluoroallyl ethers that can be used in the present disclosure include those that correspond to the formula: $CF_2=CF(CF_2)-O-R_f$ wherein $R_f$ represents a perfluorinated aliphatic group that may contain no, one or more oxygen atoms and up to 4, 6, 8, or even 10 carbon atoms. Specific examples of perfluorinated allyl ethers include: $CF_2\!=\!CF-CF_2-O-(CF_2)_nF$ wherein n is an integer from 1 to 5, and $CF_2\!=\!CF-CF_2-O-(CF_2)_x-O-(CF_2)_y-F$ wherein x is an integer from 2 to 5 and y is an integer from 1 to 5. Specific examples of perfluorinated allyl ethers include perfluoro (methyl allyl) ether ($CF_2\!=\!CF-CF_2-O-CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3-(CF_2)_2-O-CF(CF_3)-CF_2-O-CF(CF_3)-CF_2-O-CF_2CF\!=\!CF_2$, and combinations thereof.

In one embodiment of the present disclosure, the fluorinated block copolymer comprises: at least one A block polymeric unit, wherein each A block has a glass transition (Tg) temperature of greater than 0° C., 5° C., 10° C., 15° C., or even 20° C.; and less than 100° C., 90° C. 80° C., 70° C., 60° C., or even 50° C. The glass transition of the A block and B block can be difficult to determine in DSC on the polymer gum, therefore, torsion rheology of the cured sample can be used to determine the Tg. In performing torsion rheology on a cured sample using the method described in the Example Section below, two transitions are reported, $T_α$, which is the first transition and is associated with the glass transition of the B block, and $T_β$, a second, higher transition, which is associated with the glass transition of the A block.

In one embodiment, the weight average molecular weight of the semi-crystalline segment of the A block is at least 1000, 5000, 10000, or even 25000 daltons; and at most 400000, 600000, or even 800000 daltons.

The B block is a copolymer derived from at least the following monomers: hexafluoropropylene (HFP), and vinylidene fluoride (VDF). In one embodiment, the B block comprises 25-65 wt % VDF and 15-60 wt % HFP; or even 35-60 wt % VDF and 25-50 wt % HFP. In one embodiment, the B block is derived from HFP, VDF, and a bisolefin monomer. In one embodiment, the B block comprises 25-65 wt % VDF, 15-60 wt % HFP and 0.01-1 wt % of a bisolefin monomer; or even 35-60 wt % VDF, 25-50 wt % HFP and 0.02-0.5 wt % of a bisolefin monomer. Such bisolefin monomers are described above.

Additional monomers may also be incorporated into the B block, such as TFE, perfluorovinyl ether, and perfluoroallyl ether monomers, as described above. Typically, these additional monomers are used at percentages of less than 30, 20, 10, 5, 3, or even 1% by weight of the B block.

In one embodiment, the B block of the present disclosure is an amorphous segment, meaning that there is an absence of long-range order (i.e., in long-range order the arrangement and orientation of the macromolecules beyond their nearest neighbors is understood). The amorphous segment has no detectable crystalline character by DSC. If studied under DSC, the B block would have no melting point or melt transitions with an enthalpy more than 2 milliJoules/g by DSC.

In another embodiment, the B block of the present disclosure is semi-crystalline, meaning that the block would have at least one melting point ($T_m$) of greater than 60, 70, 80, or even 90° C.; and at most 110, 120, 130, or even 150° C. and a measurable enthalpy, (for example, greater than 2 millijoules/gram) when measured by DSC.

The modulus of the B block is such that it can be processed as an elastomer. In one embodiment, the B block has a modulus at 100° C. as measured at a strain of 1% and a frequency of 1 Hz of less than 2.5, 2.0, 1.5, 1, or even 0.5 MPa.

In the present disclosure, the A block and/or B block may be polymerized in the presence of a chain transfer agent, and/or optionally cure site monomers, to introduce cure sites into the fluoropolymer, which can then be used in subsequent crosslinking reactions.

In one embodiment, the chain transfer agent is of the formula $Y(CF_2)_qY$, wherein: (i) Y is independently selected from Br, or I, wherein optionally one Y is Cl and (ii) q is an integer from 1 to 12, preferably 3-12. Exemplary iodoperfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, and mixtures thereof.

In one embodiment, the chain transfer agent is a fluorinated di-iodo ether compound of the formula:

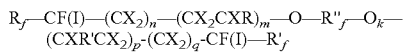

wherein

X is independently selected from F, H, and Cl;

R is F, or a partially fluorinated or perfluorinated alkane comprising 1-3 carbons;

$R_f$ and $R'_f$ are independently selected from F and a monovalent perfluoroalkane having 1-3 carbons;

$R''_f$ is a divalent fluoroalkylene having 1-5 carbons or a divalent fluorinated alkylene ether having 1-8 carbons and at least one ether linkage;

k is 0 or 1; and n, m, q, and p are independently selected from an integer from 0-5, with the proviso that when k is 0, n plus m are at least 1 and p plus q are at least 1.

Exemplary fluorinated di-iodo ether compounds include: $I-CF_2-CF_2-O-CF_2-CF_2-I$; $I-CF_2-CF_2-O-(CF_2)_b-I$ wherein b is an integer from 3-10; $I-(CF_2)_c-O-(CF_2)_b-I$ wherein c is an integer from 3-10 and b is an integer from 3-10; $ICF_2-CF_2-O-CF_2-O-CF_2-CF_2-I$;

$ICF_2-CF_2-O-CF_2-(CF_2)_b-O-CF_2-CF_2I$ wherein b is an integer from 1-5;

$ICF_2-CF_2[O-CF_2-(CF_2)_b]_z-O-CF_2-CF_2I$ wherein b is an integer from 1-5, z is an integer from 1-4;

$I-CF_2-CH_2-O-CF_2-CF_2-CF_2I$; $I-CF_2-CH_2-CF_2-O-CF_2-CF_2-CF_2I$;

$I-CF_2-CHF-CF_2-O-CF_2-CF_2-CF_2I$; $ICF_2-CF_2-O-CF_2-CFI-CF_3$ $ICF_2-CF_2-(CF_2)_a-[O-CF-CF_2]_b-(O-[CF_2]_c)_z-O-[-CF_2]_d-CF_2-CF_2I$ wherein a is an integer from 0-6, b is an integer from 0-5, c, is an integer from 1-6, d is an integer from 0-6 and z is an integer from 0-6;

$ICF_2-(CF_2)_a-(O-CF_2CF(CF_3))_b-O-(CF_2)_c-O-(CF_2-CF-O)_d-(CF_2)_z-O-CF_2CF_2-I$ wherein a is an integer from 0-6, b is an integer from 0-5, c, is an integer from 1-6, d is an integer from 0-5 and z is an integer from 0-5; and $I-CF_2-(CF_2)_a-O-(CF_2)_b-O-CF_2-CF(CF_3)-I$ wherein a is an integer from 1-5 and b is an integer from 1-5. Such fluorinated di-iodo ether compound are disclosed in WO 2015/134435 (Hintzer et al.), herein incorporated by reference.

In one embodiment, the chain transfer agent is an iodo-chloro alkane such as 2-iodo-1,2-dichloro-1,1,2-trifluoroethane, and 4-iodo-1,2,4-trichloroperfluorobutane.

In one embodiment, the cure site monomer may be selected from one or more compounds of the formula: (a) $CX_2\!=\!CX(Z)$, wherein: (i) each X is independently H or F; and (ii) Z is I, Br, or $R_f$-U wherein U=I or Br and $R_f$=a perfluorinated alkylene group optionally containing O atoms. In addition, non-fluorinated bromo- or iodo-olefins, e.g., vinyl iodide and allyl iodide, can be used. In some embodiments, the cure site monomers are derived from one or more compounds selected from the group consisting of $CF_2=CFCF_2I$, $ICF_2CF_2CF_2I$, $CF_2=CFCF_2CF_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3—OCF_2CF_2I$, $CF_2=CFCF_2Br$, $CF_2=CFOCF_2CF_2Br$, $CF_2=CFCl$, $CF_2=CFCF_2Cl$, and combinations thereof.

In one embodiment, the nitrile-containing cure site monomers may be used such as perfluoro(8-cyano-5-methyl-3,6-dioxa-1-octene); $CF_2=CFO(CF_2)_LCN$ wherein L is an integer from 2 to 12; $CF_2=CFO(CF_2)_uOCF(CF_3)CN$ wherein u is an integer from 2 to 6; $CF_2=CFO[CF_2CF(CF_3)O]_q(CF_2O)_yCF(CF_3)CN$ wherein q is an integer from 0 to 4 and y is an integer from 0 to 6; or $CF_2=CF[OCF_2CF(CF_3)]_rO(CF_2)_tCN$ wherein r is 1 or 2, and t is an integer from 1 to 4; and derivatives and combinations of the foregoing. Exemplary nitrile-containing cure site monomers include: $CF_2=CFO(CF_2)_5CN$, $CF_2=CFOCF_2CF(CF_3)OCF_2CF_2CN$, $CF_2=CFOCF_2CF(CF_3)OCF_2CF(CF_3)CN$, $CF_2=CFOCF_2CF_2CF_2OCF(CF_3)CN$, $CF_2=CFOCF_2CF(CF_3)OCF_2CF_2CN$; and combinations thereof.

In one embodiment of the present disclosure, the fluorinated block copolymer comprises: at least one B block polymeric unit, wherein each B block has a Tg temperature of less than 0° C., −10° C., −20° C., or even −30° C. As mentioned above, the glass transition of the A block and B block can be difficult to determine using DSC, therefore torsion rheology on a cured sample can be used to determine the Tg for the specific block.

The Tg of the polymeric blocks (i.e., the A block or B block) may be estimated by use of the Fox equation, based on the Tgs of the constituent monomers and the weight percent thereof. The Fox equation is described in W. R. Sorenson and T. W. Campbell's text entitled "Preparative Methods of Polymer Chemistry" Interscience, New York (1968) p. 209. Specific values for Tgs of appropriate homopolymers can be obtained from P. Peyser's chapter in polymer handbook, 3$^{rd}$ ed., edited by J. Brandrup and E. H. Immergut, Wiley, N.Y. (1989) pages V-209 through VI-227. Alternatively, the Tg of the polymeric blocks may be measured by analyzing a polymer comprising the constituent monomers and weight percent thereof via differential scanning calorimetry (DSC) or dynamic mechanical analysis (DMA).

In one embodiment, the weight average molecular weight of the B block segment is at least 5000, 10000, or even 25000; and at most 400000, 600000, or even 800000.

In the fluorinated block copolymers of the present disclosure, the A block and B block are covalently bonded together. In one embodiment, the A block is directly connected to the B block (in other words, a carbon atom of the A block is covalently bonded to a carbon atom of the B block). In one embodiment, the block copolymers of the present disclosure are a linear block copolymer. The linear block copolymer can be divided into di-block ((A-B) structure), tri-block ((A-B-A) structure), multi-block (-(A-B)$_n$-structure), and combinations thereof. In another embodiment, the block copolymers of the present disclosure may be a branched copolymer, for example a comb-type polymer wherein branches extend from a main polymer chain.

In one embodiment of the present disclosure, the fluorinated block copolymer comprises at least one B block and at least two A blocks, wherein B is a midblock and A is an end block. In another embodiment of the present disclosure, the fluorinated block copolymer comprises at least one A block and at least two B blocks, wherein A is a midblock and B is an end block. The composition of the end blocks does not have to be identical to one another, but preferably they are similar in composition.

In one embodiment, the fluorinated block copolymer consists essentially of at least one A block and at least one B block. In other words, the fluorinated block copolymer comprises only A and B block segments, however, the ends of the polymer chain, where the polymerization was terminated, may comprise a different group (a couple of atoms in size) as a result of the initiator and or chain transfer agent used during the polymerization.

In some embodiments, more than two different blocks are used. In one embodiment, multiple blocks with different weight average molecular weights or multiple blocks with different concentrations of the block polymeric units can be used. In one embodiment, a third block may be present that is derived from at least one different monomer.

In one embodiment of the present disclosure, the fluorinated block copolymer has a Tg of less than 0, −5, −10, −15, −20, or even −25° C. as determined by DSC as described in the Example Section below.

The fluorinated block copolymer of the present disclosure can be prepared by various known methods as long as the A block and B block are covalently bonded to each other in a blocked or grafted form.

In one embodiment, the B block can be prepared by iodine transfer polymerization as described in U.S. Pat. No. 4,158, 678 (Tatemoto et al.). For example, during an emulsion polymerization, a radical initiator and an iodine chain transfer agent are used to generate for example an amorphous polymer latex. The radical polymerization initiator to be used for preparing the amorphous segment may be the same as the initiators known in the art that are used for polymerization of fluorine-containing, elastomer. Examples of such an initiator are organic and inorganic peroxides and azo compounds. Typical examples of the initiator are persulfates, peroxy carbonates, peroxy esters, and the like. In one embodiment, ammonium persulfate (APS) is used, either solely, or in combination with a reducing agent like sulfites. Typically, the iodine chain transfer agent is a diiodine compound used from 0.01 to 1% by weight based on the total weight of the amorphous polymer. Exemplary diiodine compounds include: 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane. For the emulsion polymerization, various emulsifying agents can be used. From the viewpoint of inhibiting a chain transfer reaction against the molecules of emulsifying agent that arises during the polymerization, desirable emulsifying agents are salts of carboxylic acid having a fluorocarbon chain or fluoropolyether chain. In one embodiment, the amount of emulsifying agent is from about 0.05% by weight to about 2% by weight, or even 0.2 to 1.5% by weight based on the added water. The thus-obtained latex comprises an amorphous polymer that has an iodine atom which becomes a starting point of block copolymerization of the semicrystalline segment. To the thus-obtained latex, the monomer composition can be changed and the block copolymerization of the semicrystalline segment onto the amorphous polymer can be carried out.

In one embodiment, a fluorinated emulsifier having improved environmental attributes may be used during the polymerization of the block copolymers disclosed herein. In one embodiment, the fluorinated emulsifier corresponds to the general formula:

$$Y-R_f-Z-M$$

wherein Y represents hydrogen, Cl or F; $R_f$ represents a linear or branched partially fluorinated alkylene having 4 to 10 carbon atoms and optionally comprising catenary oxygen atoms; Z represents $COO^-$ or $SO_3^-$ and M represents a hydrogen ion, an alkali metal ion or an ammonium ion. Exemplary fluorinated emulsifiers may be of the general formula:

$$[R_f\text{-O-L-COO-}]_i X^{i+}$$

wherein L represents a linear or branched partially or fully fluorinated alkylene group or an aliphatic hydrocarbon group, $R_f$ represents a linear or branched partially or fully fluorinated aliphatic group or a linear or branched partially or fully fluorinated group interrupted with one or more oxygen atoms, $X^{i+}$ represents a cation having the valence i and i is 1, 2 or 3. In one embodiment, the emulsifier is selected from $CF_3$—O—$(CF_2)_3$—O—CHF—$CF_2$—COOH and salts thereof. Specific examples are described in U.S. Pat. No. 7,671,112 (Hintzer et al.), which is incorporated herein by reference. Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2OCF(CF_3)CF_2OCF(CF_3)COOH$, $CF_3(CF_2)_2(OCF_2CF_2)_4OCF(CF_3)COOH$, $CF_3OCF_2CF(CF_3)OCF(CF_3)COOH$, $C_3F_7OCF(CF_3)COOH$, $CF_3CF_2O(CF_2CF_2O)_3CF_2COOH$, and their salts.

In one embodiment a non-ionic, non-fluorinated saturated emulsifier may be used during the polymerization of the block copolymers disclosed herein. Such non-ionic, non-fluorinated emulsifiers include polycaprolactones, siloxanes, polyethylene/polypropylene glycols (cyclodextrines), carbosilanes and sugar-based emulsifiers. Other examples include polyether alcohols, sugar-based emulsifiers or hydrocarbon based emulsifiers, wherein the long chain unit may contain from 4 to 40 carbon atoms. In one embodiment, a non-fluorinated, saturated anionic emulsifier may be used during the polymerization of the block copolymers disclosed herein. Such non-fluorinated anionic emulsifiers include polyvinylphosphinic acids, polyacrylic acids, polyvinyl sulfonic acids, and alkyl phosphonic acids (for example, alkyl phosphates, hydrocarbon anionic surfactants as described, for example in U.S. Pat. Nos. 7,521,513 and 6,512,063 (Tang), herein incorporated by reference). These emulsifiers and their use in fluoropolymer polymerization is described in WO 2016/137851 (Jochum et al.), herein incorporated by reference.

The fluorinated block copolymer gum of the present disclosure may or may not be crosslinked. Crosslinking of the resulting fluorinated block copolymer can be performed using a cure system that is known in the art such as: a peroxide curative, 2,3-dimethyl-2,3-dimethyl-2,3-diphenyl butane, and other radical initiators such as an azo compound, and other cure systems such as a polyol and polyamine cure systems.

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a polyolefin crosslinking aid including, for example, bisolefins (such as $CH_2$=$CH(CF_2)_6CH$=$CH_2$, and $CH_2$=$CH(CF_2)_8CH$=$CH_2$), diallyl ether of glycerin, triallylphosphoric acid, diallyl adipate, diallylmelamine and triallyl isocyanurate (TAIC), fluorinated TAIC comprising a fluorinated olefinic bond, tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide.

Examples of the organic peroxide include benzoyl peroxide, dicumyl peroxide, di-tert-butyl peroxide, 2,5-dimethyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluorinated block copolymer. Other conventional radical initiators are suitable for use with the present disclosure.

Examples of azo compounds useful in curing the fluorinated block copolymers of the present disclosure are those that have a high decomposition temperature. In other words, they decompose above the upper use temperature of the resulting product. Such azo compounds may be found for example in "Polymeric Materials Encyclopedia, by J. C. Salamone, ed., CRC Press Inc., New York, (1996) Vol. 1, page 432-440.

Crosslinking using a polyol is performed generally by using a polyol compound as a crosslinking agent; a crosslinking aid such as ammonium salt, phosphonium salt and iminium salt; and a hydroxide or oxide of a divalent metal such as magnesium, calcium, or zinc. Examples of the polyol compound include bisphenol AF, bisphenol A, bisphenol S, dihydroxybenzophenone, hydroquinone, 2,4,6-trimercapto-S-triazine, 4,4'-thiodiphenol, and a metal salt thereof.

Crosslinking using a polyamine is performed generally by using a polyamine compound as a crosslinking agent, and an oxide of a divalent metal such as magnesium, calcium, or zinc. Examples of the polyamine compound or the precursor of the polyamine compound include hexamethylenediamine and a carbamate thereof, 4,4'-bis(aminocyclohexyl)methane and a carbamate thereof, and N,N'-dicinnamylidene-1,6-hexamethylenediamine.

The crosslinking agent (and crosslinking aid, if used) each may be used in a conventionally known amount, and the amount used can be appropriately determined by one skilled in the art. The amount used of each of these components participating in the crosslinking may be, for example, about 1 part by mass or more, about 5 parts by mass or more, about 10 parts by mass or more, or about 15 parts by mass or more, and about 60 parts by mass or less, about 40 parts by mass or less, about 30 parts by mass or less, or about 20 parts by mass or less, per 100 parts by mass of the fluorinated block copolymer. The total amount of the components participating in the crosslinking may be, for example, about 1 part by mass or more, about 5 parts by mass or more, or about 10 parts by mass or more, and about 60 parts by mass or less, about 40 parts by mass or less, or about 30 parts by mass or less, per 100 parts by mass of the fluorinated block copolymer.

In one embodiment, a dual cure or multi cure system is used, wherein at least two different cure systems are used. For example, peroxide curing system and a bisphenol curing system or a peroxide curing system and a triazine curing system. Such a multi cure system may provide enhanced physical properties and/or ease of handling.

For the purpose of, for example, enhancing the strength or imparting the functionality, conventional adjuvants, such as, for example, acid acceptors, fillers, process aids, or colorants may be added to the composition.

For example, acid acceptors may be used to facilitate the cure and thermal stability of the composition. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in an amount raging from about 1 to about 20 parts per 100 parts by weight of the fluorinated block copolymer.

Fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10). In one embodiment, the composition comprises less than 40, 30, 20, 15, or even 10% by weight of the filler.

The fluorinated block copolymer composition is mixed with the curing agent and optional conventional adjuvants. The method for mixing includes, for example, kneading with use of a twin roll for rubber, a pressure kneader or a Banbury mixer.

The mixture may then be processed and shaped such as by extrusion or molding to form an article of various shapes such as sheet, a hose, a hose lining, an o-ring, a gasket, a packer, or a seal composed of the composition of the present disclosure. The shaped article may then be heated to cure the gum composition and form a cured elastomeric article.

Pressing of the compounded mixture (i.e., press cure) is typically conducted at a temperature of about 120-220° C., or even about 140-200° C., for a period of about 1 minute to about 15 hours, usually for about 1-15 minutes. A pressure of about 700-20,000 kPa (kiloPascals), or even about 3400-6800 kPa, is typically used in molding the composition. The molds first may be coated with a release agent and prebaked.

The molded vulcanizate can be post cured in an oven at a temperature of about 140-240° C., or even at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

Fluorinated block copolymers of the present disclosure may be used in articles, such as a hose, a seal (e.g., a gasket, an o-ring, a packer element, a blow-out preventor, a valve, etc.), a stator, or a sheet. These compositions may or may not be post cured.

By taking advantage of the high tensile and high modulus afforded by the A block, a fluorinated block copolymer having good toughness (e.g., high tensile strength) and good compression set can be achieved.

The fluorinated block copolymer of the present disclosure balances the toughness imparted by the A block with the viscosity (and optional flexibility) imparted by the B block. This balancing of the A block and B block generates a fluorinated block copolymer that can be processed as a traditional elastomer, for example a polymer that can be processed with a two-roll mill or an internal mixer. Mill blending is a process that rubber manufacturers use to combine the polymer gum with the requisite curing agents and/or additives. In order to be mill blended, the curable composition must have a sufficient modulus. In other words, not too soft that it sticks to the mill, and not too stiff that it cannot be banded onto mill. The fluorinated block copolymer of the present disclosure has a modulus of at least 0.1, 0.3, or even 0.5 MPa (megaPascals); and at most 2.5, 2.2, or even 2.0 MPa at 100° C. as measured at a strain of 1% and a frequency of 1 Hz (Hertz). The amount of the A block to B block used in the fluorinated block copolymer can vary based on the properties of the individual polymeric segments. For example, if the A block has a high degree of crystallinity, then less overall A block is used in the fluorinated block copolymer. Thus, the storage modulus is a property that can be used to take into account using less of a semicrystalline segment with a high degree of crystallinity in the block copolymer versus more of a semicrystalline segment with a lower degree of crystallinity. By adding more A block into the fluorinated block copolymer, better tensile is obtained and the polymer retains the properties at high temperatures. However, if too much A block is used, the composition is unable to be processed as an elastomer.

In one embodiment, the fluorinated block copolymer of the present disclosure has a melting point of at least 100, 110, 150, or even 175° C.; and at most 275, 250, or even 200° C. It is believed that the melting point of the fluorinated block copolymer is based on the melting point of the semicrystalline segment since amorphous polymer does not have a melting point. In one embodiment, the melting point of the block copolymer is greater than the upper use temperature of the resulting article to maximize the reinforcement effect of the A block.

In one embodiment, the fluorinated block copolymer of the present disclosure has a Tg of greater than −40, −30, or even −20° C.; and at most 15, 10, 0, or even −5° C. as measured by DSC as described in the Example Section below. Both the A block and the B block will have a Tg. In general, the Tg of the B block is believed to be responsible for the Tg of the reported block copolymer.

In one embodiment, the fluorinated block copolymer of the present disclosure has a melt flow index of greater than 5, 10, 20, or even 30; and at most 40, 50, 60, 70, 80, or even 90 as measured by ASTM D 1238-13 "Standard Test Method for Melt Flow Rates of Thermoplastics by Extrusion Plastomer" with a 5 Kg load at 230° C.

Depending on the method of making the fluorinated block copolymer and/or the cure site monomers and/or the chain transfer agent used, the fluorinated block copolymer may comprise iodine. In one embodiment, the fluorinated block copolymer comprises at least 0.05, 0.1, or even 0.2 wt %;

and at most 0.5, 0.8, or even 1 wt % of iodine based on the weight of the fluorinated block copolymer.

The fluorinated block copolymers of the present disclosure may have a weight average molecular weight (Mw) of at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the fluorinated block copolymer.

The fluorinated block copolymers of the present disclosure, wherein the A block and B block are covalently bonded together, have improved properties over the mixture (or blend) of the two individual polymers, for example higher tensile strength and improved compression set.

The fluorinated block copolymers of the present disclosure have been found to have good tensile strength, and 100% modulus. Surprisingly, it has also been discovered that the fluorinated block copolymer of the present disclosure has good compression set. Compression set is the deformation of the polymer remaining once a force is removed. Generally, lower compression set values are better (i.e., less deformation of the material). Typically, plastics (comprising a semicrystalline morphology) do not have a good compression set. Therefore, it was surprising that the fluorinated block copolymer comprising the semicrystalline segment has a good compression set. It was also surprising that the fluorinated block copolymers of the present disclosure retained their properties at elevated temperatures.

Exemplary embodiments of the present disclosure include, but should not be limited to, the following:

Embodiment 1. A curable composition comprising a millable fluorinated block copolymer having
(a) at least one A block, wherein the A block is a semi-crystalline segment comprising repeating divalent monomeric units derived from at least TFE, HFP and VDF;
(b) at least one B block, wherein the B block is a segment comprising repeating dilvalent monomeric units derived from at least HFP and VDF; and
(c) a bisolefin monomer, wherein at least (i) the semi-crystalline segment of the A block comprises repeating divalent monomeric units derived from TFE, HFP, VDF, and the bisolefin monomer, (ii) the segment of the B block comprises repeating divalent monomeric units derived from HFP, VDF, and the bisolefin monomer, or (iii) a combination thereof; and
wherein the millable fluorinated block copolymer has a modulus of 0.1 to 2.5 MPa at 100° C.

Embodiment 2. The curable composition of embodiment 1, wherein the bisolefin monomer is of the formula

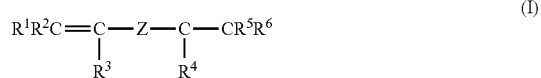

wherein $R^1$, $R^2$, $R^3$, $R^4$, $R^5$, and $R^6$ are independently H, a C1-C5 alkyl group, or a C1-C5 fluorinated alkyl group; and Z is an alkylene or cycloalkylene C1-C18 radical, which is linear or branched, optionally containing oxygen atoms and optionally fluorinated.

Embodiment 3. The curable composition of embodiment 2, wherein the bisolefin monomer is at least one of: $CH_2=CH(CF_2)_4CH=CH_2$, $CH2=CH(CF_2)_6CH=CH_2$, $CH_2=CH(CF_2)_8CH=CH_2$.

Embodiment 4. The curable composition of embodiment 2, wherein the bisolefin monomer is at least one of: $CF_2=CF-O-(CF_2)_2-O-CF=CF_2$, $CF_2=CF-O-(CF_2)_3-O-CF=CF_2$, $CF_2=CF-O-(CF_2)_4-O-CF=CF_2$, $CF_2=CF-O-(CF_2)_5-O-CF=CF_2$, $CF_2=CF-O-(CF_2)_6-O-CF=CF_2$, $CF_2=CF-CF_2-O-(CF_2)_2-O-CF=CF_2$, $CF_2=CF-CF_2-O-(CF_2)_3-O-CF=CF_2$, $CF_2=CF-CF_2-O-(CF_2)_4-O-CF=CF_2$, $CF_2=CF-CF_2-O-(CF_2)_5-O-CF=CF_2$, $CF_2=CF-CF_2-O-(CF_2)_6-O-CF=CF_2$, $CF_2=CF-CF_2-O-(CF_2)_2-O-CF_2-CF=CF_2$, $CF_2=CF-CF_2-O-(CF_2)_3-O-CF_2-CF=CF_2$, $CF_2=CF-CF_2-O-(CF_2)_4-O-CF_2-CF=CF_2$, $CF_2=CF-CF_2-O-(CF_2)_5-O-CF_2-CF=CF_2$, $CF_2=CF-CF_2-O-(CF_2)_6-O-CF_2-CF=CF_2$, $CF_2=CF-O-CF_2CF_2-CH=CH_2$, $CF_2=CF-(OCF(CF_3)CF_2)-O-CF_2CF_2-CH=CH_2$, $CF_2=CF-(OCF(CF_3)CF_2)_2-O-CF_2CF_2-CH=CH_2$, $CF_2=CFCF_2-O-CF_2CF_2-CH=CH_2$, $CF_2=CFCF_2-(OCF(CF_3)CF_2)-O-CF_2CF_2-CH=CH_2$, $CF_2=CFCF_2-(OCF(CF_3)CF_2)_2-O-CF_2CF_2-CH=CH_2$, $CF_2=CF-CF_2-CH=CH_2$, $CF_2=CF-O-(CF_2)_c-O-CF_2-CF_2-CH=CH_2$ wherein c is an integer selected from 2 to 6, $CF_2=CFCF_2-O-(CF_2)_c-O-CF_2-CF_2-CH=CH_2$ wherein c is an integer selected from 2 to 6, $CF_2=CF-(OCF(CF_3)CF_2)_b-O-CF(CF_3)-CH=CH_2$ wherein b is 0, 1, or 2, $CF_2=CF-CF_2-(OCF(CF_3)CF_2)_b-O-CF(CF_3)-CH=CH_2$ wherein b is 0, 1, or 2, $CH_2=CH-(CF_2)_n-O-CH=CH_2$ wherein n is an integer from 1-10, and $CF_2=CF-(CF_2)_a-(O-CF(CF_3)CF_2)_b-O-(CF_2)_c-(OCF(CF_3)CF_2)_fO-CF=CF_2$ wherein a is 0 or 1, b is 0, 1, or 2, c is 1, 2, 3, 4, 5, or 6, and f is 0, 1, or 2

Embodiment 5. The curable composition of any one of the previous embodiments, wherein the fluorinated block copolymer has a melting point of at least 100° C. and at most 275° C.

Embodiment 6. The curable composition of any one of the previous embodiments, wherein the B block is semi-crystalline.

Embodiment 7. The curable composition of any one of embodiments 1-5, wherein the B block is amorphous.

Embodiment 8. The curable composition of any one of the previous embodiments, wherein the Tg of the A block is greater than 0° C. and less 80° C.

Embodiment 9. The curable composition of any one of the previous embodiments, wherein the Tg of the B block is less than 0° C.

Embodiment 10. The curable composition of any one of the previous embodiments, wherein the A block comprises repeating divalent monomeric units further derived from at least one of a perfluorovinyl ether monomer, and a perfluoroallyl ether monomer.

Embodiment 11. The curable composition of embodiment 10, wherein the perfluorovinyl ether is selected from at least one of: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2=CFOCF_2OCF_3$, $CF_2=CFOCF_2OCF_2CF_3$, and $CF_3-(CF_2)_2-O-CF(CF_3)-CF_2-O-CF(CF_3)-CF_2-O-CF=CF_2$.

Embodiment 12. The curable composition of embodiment 11, wherein the perfluoroallyl ether is selected from at least one of: perfluoro (methyl allyl) ether ($CF_2=CF-CF_2-O-CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxyethyl allyl ether, perfluoro-methoxy-methyl allyl ether, and $CF_3-(CF_2)_2-O-CF(CF_3)-CF_2-O-CF(CF_3)-CF_2-O-CF_2CF=CF_2$.

Embodiment 13. The curable composition of any one of the previous embodiments, wherein the B block segment further comprises repeating divalent monomeric units derived from TFE, a cure site monomer, a perfluorovinyl ether monomer, a perfluoroallyl ether monomer, and combinations thereof.

Embodiment 14. The curable composition of embodiment 13, wherein the cure site monomer is selected from at least one of: $CF_2=CFCF_2I$, $CF_2=CFCF_2CF_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CF_2=CFCF_2Br$, $CF_2=CFOCF_2CF_2Br$, $CF_2=CFCl$, $CF_2=CFCF_2Cl$, and combinations thereof Embodiment 15. The curable composition of any one of the previous embodiments, wherein the millable fluorinated block copolymer comprises about 0.05 wt % to about 1 wt % of iodine based on the weight of the millable fluorinated block copolymer.

Embodiment 16. The curable composition of any one of the previous embodiments, further comprising a peroxide cure system.

Embodiment 17. A cured article derived from the curable composition of any one of the previous embodiments.

Embodiment 18. The cured article of embodiment 17, wherein the article is a packer, an o-ring, a seal, a gasket, a hose, or a sheet.

Embodiment 19. The curable composition of any one of embodiments 1-16, wherein the glass transition temperature of the millable fluorinated block copolymer is less than −20° C.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: phr=parts per hundred rubber; rpm=revolutions per minute; g=grams; kg=kilograms; min=minutes; h=hour; ° C.=degrees Celsius; MPa=megapascals; psi=pounds per square inch; Hz=Hertz; wt=weight; mm=millimeters; in=inches; lb=pounds, and dNm=deci Newton-meter.

Methods
Melting Point and Glass Transition Temperatures

Melting point ($T_m$) and glass transition temperature ($T_g$) were determined by differential scanning calorimetry (DSC, Q2000 by TA Instruments, New Castle, Del.) under a nitrogen flow. The sample size was 5 mg±0.25 mg. A DSC thermogram was obtained from the second heat of a heat/cool/heat cycle. The first heat cycle started at −85° C. and was ramped at a rate of 10° C./min up to 300° C. The cooling cycle started at the final temperature from the first heat cycle and was cooled to −85° C. at 10° C./min. The second heat cycle started at −85° C. and was ramped at a rate of 10° C./min back up to 300° C. Results are reported in Table 1.

Modulus

Modulus at 100° C. was determined using a rheometer (RPA 2000 by Alpha technologies, Akron, Ohio) at a strain of 1% and a frequency of 1 Hz from the storage modulus, which is obtained from ASTM 6204-07. Results are reported in Table 1.

Cure Rheology

Cure rheology tests were carried out using uncured, compounded samples using a rheometer (PPA 2000 by Alpha technologies, Akron, Ohio), in accordance with ASTM D 5289-93a at 177° C., no pre-heat, 12 min elapsed time, and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ ($t_S2$), the time for the torque to reach a value equal to $M_L+0.1(M_H-M_L)$, (t'10), the time for the torque to reach a value equal to $M_L+0.5(M_H-M_L)$, (t'50), and the time for the torque to reach $M_L+0.9(M_H-M_L)$, (t'90). Results are reported in Table 2.

Physical Properties

O-rings having a cross-section thickness of 0.139 in (3.5 mm) and sheets having a thickness of 2.0 mm were molded using the uncured compounded sample and press cured, followed by a postcure as noted in Table 2. The dumbbell specimens were cut out from the sheets and subjected to physical property testing similar to the procedure disclosed in ASTM D412-06a (2013). Tensile strength at break, elongation at break, 50% modulus, and 100% Modulus were reported. 50% Modulus and 100% Modulus were determined by the tensile strength at 50% elongation and 100% elongation respectively. The O-rings were subjected to compression set testing similar to the procedure disclosed in ASTM 395-89 method B, with 25% initial deflection. Results are reported in Table 2.

| Materials Table | |
|---|---|
| Name | Source |
| 1,4-Diiodooctafluorobutane | Commercially available from Tosoh Corp., Grove City, OH. |
| Emulsifier | An aqueous solution comprising 30% by weight of $CF_3OCF_2CF_2CF_2OCHFCF2CO_2NH_4$ is the ammonium salt of the compound prepared as in "Preparation of Compound 11" in U.S. Pat. No. 7,671,112 and 1.5% by weight of a fully-fluorinated compound sold under the trade designation "3M FLUOROINERT ELECTRONIC LIQUID FC-70" from 3M Co. St. Paul, MN |
| C6DV | 1,6-divinylperfluorohexane, commercially available from Abcr, Karlsruhe, Germany |
| APS | Ammonium persulfate, available from Sigma-Aldrich Company |
| Carbon Black | N990 Carbon black commercially available from Cancarb Ltd, Medicine Hat, Alta., Canada |

-continued

Materials Table

| Name | Source |
| --- | --- |
| Coagent | Triallyl-isocyanurate commercially available under the trade designation "TAIC" from Nippon Kasei Chemical Co. Ltd., Tokyo, Japan |
| Peroxide | 2,5-dimethyl-2,5-di(t-butylperoxy)-hexane, 50% active, available under the trade designation "VAROX DBPH-50" from Vanderbilt Chemicals, LLC., Norwalk, CT. |
| Potassium phosphate | Available from Sigma-Aldrich Company |
| Magnesium chloride | Available from Sigma-Aldrich Company |

Preparative Example 1 (PE-1)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 14.6 g of C6DV, 330 g of Emulsifier, and 20 g of APS. 2500 g of deionized water was used to flush the reactants into the reactor. Vacuum was broken with HFP. Immediately following this addition the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and left in the reactor.

A block: The latex from the B block above still in the reactor was then brought to 60° C., with the reactor at temperature the agitator rate was set at 350 rpm, and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −11° C., and Tm determined by DSC of 266° C. The theoretical ratio the B block to the A block was 80:20.

Preparative Example 2 (PE-2)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 1.5 g of C6DV, 330 g of Emulsifier, and 20 g of APS. 2500 g of deionized water was used to flush the reactants into the reactor. Vacuum was broken with HFP. Immediately following this addition, the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and left in the reactor.

A block: The latex from the B block above still in the reactor was then brought to 60° C., with the reactor at temperature the agitator rate was set at 350 rpm, and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −11° C., and Tm determined by DSC of 257° C. The theoretical ratio the B block to the A block was 80:20.

Example 3 (PE-3)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 43.8 g of C6DV, 330 g of Emulsifier, and 20 g of APS. 2500 g of deionized water was used to flush the reactants into the reactor. Vacuum was broken with HFP. Immediately following this addition, the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and left in the reactor.

A block: The latex from the B block above still in the reactor was then brought to 60° C., with the reactor at temperature the agitator rate was set at 350 rpm, and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −11° C., and Tm determined by DSC of 253° C. The theoretical ratio the B block to the A block was 80:20.

Example 4 (PE-4)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 73 g of C6DV, 330 g of Emulsifier, and 20 g of APS. 2500 g of deionized water was used to flush the reactants into the reactor. Vacuum was broken with HFP. Immediately following this addition, the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and left in the reactor.

A block: The latex from the B block above still in the reactor was then brought to 60° C., with the reactor at temperature the agitator rate was set at 350 rpm, and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −10° C., and Tm determined by DSC of 256° C. The theoretical ratio the B block to the A block was 80:20.

Preparative Example 5 (PE-5)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 330 g of Emulsifier, and 20 g of APS. 2500 g of deionized water was used to flush the reactants into the reactor. Vacuum was broken with HFP. Immediately following this addition, the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and the latex was left in the reactor.

A block: The latex from the B block above still in the reactor was then brought to 60° C. Once at temperature, 14.6 g of C6DV were added. With the reactor at temperature, the agitator rate was set at 350 rpm and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −11° C., and Tm determined by DSC of 245° C. The theoretical ratio the B block to the A block was 80:20.

Preparative Example 6 (PE-6)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 7.3 g of C6DV, 330 g of Emulsifier, and 20 g of APS. 2500 g of deionized water was used to flush the reactants into the reactor. Vacuum was broken with HFP. Immediately following this addition, the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and the latex was left in the reactor.

A block: The latex from the B block above still in the reactor was then brought to 60° C. Once at temperature, 7.3 g of C6DV were added. With the reactor at temperature, the agitator rate was set at 350 rpm and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −11° C., and Tm determined by DSC of 256° C. The theoretical ratio the B block to the A block was 80:20.

Preparative Example 7 (PE-7)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 14.6 g of MVSCN, 330 g of Emulsifier, and 20 g of APS. 2500 g of deionized water was used to flush the reactants into the reactor. Vacuum was broken with HFP. Immediately following this addition, the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and left in the reactor.

A block: The latex from the B block above still in the reactor was then brought to 60° C. Once at temperature, 14.6 g of C6DV were added. With the reactor at temperature, the agitator rate was set at 350 rpm and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −11° C., and Tm determined by DSC of 250° C. The theoretical ratio the B block to the A block was 80:20.

Preparative Example 8 (PE-8)

B block: A 40 liter reactor was charged with 22500 g of deionized water and heated to 80° C. The agitator rate was then brought to 350 rpm, followed by additions of 40 g of potassium phosphate, 140 g of 1,4 Diiodooctafluorobutane, 330 g of Emulsifier, and 20 g of APS. 2500 f of deionized water was used to flush the reactants into the reactor. Vacuum was broken with HFP. Immediately following this addition, the reactor was pressured up with a HFP/VDF ratio of 0.88 and a TFE/VDF ratio of 1.0 until the reactor reached a pressure of 1.5 MPa. Once at pressure, monomer ratios were changed to HFP/VDF of 1.24 and TFE/VDF of 0.73. The reaction was run until 25% solids, stopped, and the latex was left in the reactor.

A block: The latex from the B block above still in the reactor was then brought to 71.1° C. With the reactor at temperature, the agitator rate was set at 350 rpm and the vacuum was broken with nitrogen. The reactor was brought up to a pressure of 1.6 MPa using a HFP/VDF ratio of 0.768 and a TFE/VDF ratio of 8.068. The reaction was carried out at the same ratios until 30% solids. The latex was then coagulated using a 1.25% magnesium chloride solution in deionized water, and oven dried at 130° C. for 32 h.

The fluorinated block copolymer had a Tg of −11° C., and Tm determined by DSC of 258° C. The theoretical ratio the B block to the A block was 80:20.

A summary of the Tg, Tm, and Modulus at 100° C., for the various polymers measured using the test methods described above is shown in Table 1 below.

TABLE 1

| Polymer | PE-1 | PE-2 | PE-3 | PE-4 | PE-5 | PE-6 | PE-7 | PE-8 |
|---|---|---|---|---|---|---|---|---|
| $T_g$ (° C.) | −11 | −11 | −11 | −10 | −11 | −11 | −11 | −11 |
| $T_m$ (° C.) | 266 | 257 | 253 | 256 | 245 | 256 | 250 | 258 |
| Modulus at 100° C. (MPa) | 0.72 | 0.86 | 1.07 | 1.62 | 0.77 | 0.72 | 0.48 | 0.72 |

Examples 1-7 and Counter Example 1 (EX-1 to EX-7 and CE-1)

Each of the polymers described above were individually compounded in about 400 g batches on a two-roll mill as follows: 100 parts of the polymer, 30 phr of Carbon Black, 3 phr Coagent, and 2 phr Peroxide. The compounded polymers were tested as per "Cure Rheology" and "Physical Properties" as described above and the results are reported in Table 2.

TABLE 2

|  | EX-1 | EX-2 | EX-3 | EX-4 | EX-5 | EX-6 | EX-7 | CE-1 |
|---|---|---|---|---|---|---|---|---|
| Polymer | PE-1 | PE-2 | PE-3 | PE-4 | PE-5 | PE-6 | PE-7 | PE-8 |
| $M_L$, in-lb (Nm) | 3.9 (0.4) | 3.2 (0.4) | 4.2 (0.5) | 10.3 (1.2) | 3.9 (0.4) | 1.9 (0.2) | 3.7 (0.4) | 4.4 (0.5) |
| $M_H$, in-lb (Nm) | 46.6 (5.3) | 44.3 (5.3) | 48.4 (5.5) | 54.7 (6.2) | 43.8 (4.9) | 47.8 (5.4) | 43.1 (4.9) | 46.4 (5.2) |
| Δ torque in-lb (Nm) | 42.7 (4.8) | 41.1 (4.8) | 44.3 (5.0) | 44.4 (5.0) | 39.9 (4.5) | 45.9 (5.2) | 39.4 (4.5) | 42.0 (4.7) |
| $t_S2$, min | 0.8 | 0.7 | 0.8 | 0.7 | 0.8 | 0.7 | 0.8 | 0.8 |
| t'50, min | 1.5 | 1.5 | 1.5 | 1.4 | 1.6 | 1.5 | 1.7 | 1.6 |
| t'90, min | 1.22 | 1.39 | 1.24 | 0.56 | 0.48 | 1.87 | 0.51 | 0.62 |
| tan δ $M_L$ | 0.051 | 0.054 | 0.051 | 0.066 | 0.058 | 0.058 | 0.56 | 0.069 |
| tan δ $M_H$ | 3.9 (0.4) | 3.2 (0.4) | 4.2 (0.5) | 10.3 (1.2) | 3.9 (0.4) | 1.9 (0.2) | 3.7 (0.4) | 4.4 (0.5) |
| Physical Properties: Press Cure 10 mins @177° C., Post Cure 4 h at 232° C. | | | | | | | | |
| Tensile Strength, psi (MPa) | 3866 (27) | 4822 (33) | 5033 (35) | 3200 (22) | 4398 (30) | 3931 (27) | 4232 (29.2) | 4155 (28.7) |
| Elongation @ break % | 93 | 144 | 119 | 60 | 122 | 121 | 115 | 118 |
| 50% Modulus, psi (MPA) | 2011 (14) | 1680 (12) | 1954 (13) | 2797 (19) | 1696 (12) | 1571 (11) | 1760 (12.1) | 1777 (12.3) |
| 100% Modulus, psi (MPa) | NA | 3352 (23) | 4196 (29) | NA | 3559 (25) | 3129 (22) | 3732 (25.8) | 3651 (25.2) |
| Hardness, Shore A ASTM D2240-05 | 95 | 95 | 94 | 95 | 95 | 95 | 92 | 95 |
| Compression set % (70 h @ 200° C.) | 49 | 51 | 41 | 46 | 49 | 45 | 46 | 51 |
| Physical Properties measured at 150° C.: Press Cure 10 mins @ 177° C., Post Cure 4 h at 232° C. | | | | | | | | |
| Tensile Strength, psi (MPa) | 1277 (9) | 1310 (9) | 1570 (11) | 874 (6) | 1224 (8) | 1041 (7) | 1360 (9.4) | 1030 (7.1) |
| Elongation @ break % | 125 | 160 | 145 | 77 | 142 | 135 | 133 | 127 |
| 100% Modulus, psi (MPa) | 994 (7) | 751 (5) | 994 (7) | NA | 788 (5) | 735 (5) | 931 (6.4) | 823 (5.7) |

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A curable composition comprising:
   a millable fluorinated block copolymer having
   (a) at least one A block, wherein the A block is a semi-crystalline segment comprising repeating divalent monomeric units derived from at least TFE, HFP and VDF;
   (b) at least one B block, wherein the B block is a segment comprising repeating divalent monomeric units derived from at least HFP and VDF; and
   (c) a bisolefin monomer, wherein at least (i) the semi-crystalline segment of the A block comprises repeating divalent monomeric units derived from TFE, HFP, VDF, and the bisolefin monomer, (ii) the segment of the B block comprises repeating divalent monomeric units derived from HFP, VDF, and the bisolefin monomer, or (iii) a combination thereof; and
   wherein the millable fluorinated block copolymer has a modulus of 0.1 to 2.5 MPa at 100° C.

2. The curable composition of claim 1, wherein the bisolefin monomer is of the formula (I)

wherein $R^1$, $R^2$, $R^3$, $R^4$, $R^5$, and $R^6$ are independently H, a C1-C5 alkyl group, or a C1-C5 fluorinated alkyl group; and Z is an alkylene or cycloalkylene C1-C18 radical, which is linear or branched, optionally containing oxygen atoms and optionally fluorinated.

3. The curable composition of claim 2, wherein the bisolefin monomer is at least one of: $CH2=CH(CF_2)_4CH=CH_2$, $CH2=CH(CF_2)_6CH=CH_2$, $CH_2=CH(CF_2)_8CH=CH_2$.

4. The curable composition of claim 2, wherein the bisolefin monomer is at least one of: $CF_2=CF-O-(CF_2)_2-O-CF=CF_2$, $CF_2=CF-O-(CF_2)_3-O-CF=CF_2$, $CF_2=CF-O-(CF_2)_4-O-CF=CF_2$, $CF_2=CF-O-(CF_2)_5-O-CF=CF_2$, $CF_2=CF-O-(CF_2)_6-O-CF=CF_2$, $CF_2=CF-CF_2-O-(CF_2)_2-O-CF=CF_2$, $CF_2=CF-CF_2-O-(CF_2)_3-O-CF=CF_2$, $CF_2=CF-CF_2-O-(CF_2)_4-O-CF=CF_2$, $CF_2=CF-CF_2-O-(CF_2)_4-O-CF=CF_2$, $CF_2=CF-CF_2-O-(CF_2)_5-O-CF=CF_2$, $CF_2=CF-CF_2-O-(CF_2)_6-O-CF=CF_2$, $CF_2=CF-CF_2-O-(CF_2)_2-O-CF_2-CF=CF_2$, $CF_2=CF-CF_2-O-(CF_2)_3-O-CF_2-CF=CF_2$, $CF_2=CF-CF_2-O-(CF_2)_4-O-CF_2-CF=CF_2$, $CF_2=CF-CF_2-O-(CF_2)_5-O-CF_2-CF=CF_2$, $CF_2=CF-CF_2-O-(CF_2)_6-O-CF_2-CF=CF_2$, $CF_2=CF-CF_2-O-CF_2CF_2-CH=CH_2$, $CF_2=CF-(OCF(CF_3)CF_2)-O-CF_2CF_2-CH=CH_2$, $CF_2=CF-(OCF(CF_3)CF_2)_2-O-CF_2CF_2-CH=CH_2$, $CF_2=CFCF_2-O-CF_2CF_2-CH=CH_2$, $CF_2=CF-CF_2-(OCF(CF_3)CF_2-O-CF_2CF_2-CH=CH_2$, $CF_2=CFCF_2-(OCF(CF_3)CF_2)_2-O-CF_2CF_2-CH=CH_2$, $CF_2=CF-CF_2-CH=CH_2$, $CF_2=CF-O-(CF_2)_c-O-CF_2-CF_2-CH=CH_2$ wherein c is an integer selected from 2 to 6, $CF_2=CFCF_2-O-(CF_2)_c-O-CF_2-CF_2-CH=CH_2$ wherein c is an integer selected from 2 to 6, $CF_2=CF-(OCF(CF_3)CF_2)_b-O-CF(CF_3)-CH=CH_2$ wherein b is 0, 1, or 2, $CF_2=CF-CF_2-(OCF(CF_3)CF_2)_b-O-CF(CF_3)-CH=CH_2$ wherein b is 0, 1, or 2, $CH_2=CH-(CF_2)_n-O-CH=CH_2$ wherein n is an integer from 1-10, and $CF_2=CF-(CF_2)_a-(O-CF(CF_3)CF_2)_b-O-(CF_2)_c-(OCF(CF_3)CF_2)_f-O-CF=CF_2$ wherein a is 0 or 1, b is 0, 1, or 2, c is 1, 2, 3, 4, 5, or 6, and f is 0, 1, or 2.

5. The curable composition of claim 1, wherein the fluorinated block copolymer has a melting point of at least 100° C. and at most 275° C.

6. The curable composition of claim 1, wherein the B block is semi-crystalline.

7. The curable composition of claim 1, wherein the B block is amorphous.

8. The curable composition of claim 1, wherein the Tg of the A block is greater than 0° C. and less 80° C.

9. The curable composition of claim 1, wherein the Tg of the B block is less than 0° C.

10. The curable composition of claim 1, further comprising a peroxide cure system.

11. The curable composition of claim 1, wherein the glass transition temperature of the millable fluorinated block copolymer is less than −20° C.

12. A cured article derived from the curable composition of claim 1.

13. The cured article of claim 12, wherein the article is a packer, an o-ring, a seal, a gasket, a hose, or a sheet.

14. The curable composition of claim 1, wherein the A block comprises repeating divalent monomeric units further derived from at least one of a perfluorovinyl ether monomer, and a perfluoroallyl ether monomer.

15. The curable composition of claim 14, wherein the perfluorovinyl ether is selected from at least one of: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethyl-vinyl ether, $CF_2=CFOCF_2OCF_3$, $CF_2=CFOCF_2OCF_2CF_3$, and $CF_3-(CF_2)_2-O-CF(CF_3)-CF_2-O-CF(CF_3)-CF_2-O-CF=CF_2$.

16. The curable composition of claim 14, wherein the perfluoroallyl ether is selected from at least one of: perfluoro (methyl allyl) ether ($CF_2=CF-CF_2-O-CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoromethoxy-methyl allyl ether, and $CF_3-(CF_2)_2-O-CF(CF_3)-CF_2-O-CF(CF_3)-CF_2-O-CF_2CF=CF_2$.

17. The curable composition of claim 1, wherein the B block segment further comprises repeating divalent monomeric units derived from TFE, a cure site monomer, a perfluorovinyl ether monomer, a perfluoroallyl ether monomer, and combinations thereof.

18. The curable composition of claim 17, wherein the cure site monomer is selected from at least one of: $CF_2=CFCF_2I$, $CF_2=CFCF_2CF_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CF_2=CFCF_2Br$, $CF_2=CFOCF_2CF_2Br$, $CF_2=CFCl$, $CF_2=CFCF_2Cl$, and combinations thereof.

19. The curable composition of claim 1, wherein the millable fluorinated block copolymer comprises about 0.05 wt % to about 1 wt % of iodine based on the weight of the millable fluorinated block copolymer.

* * * * *